(12) United States Patent
Rolando (10) Patent No.: US 8,326,514 B2
(45) Date of Patent: Dec. 4, 2012

(54) DRIVE FOR AN INTERNAL COMBUSTION ENGINE COMPRISING AN OIL WET TOOTHED BELT AND A TENSIONING SHOE

(75) Inventor: Adriano Rolando, Valperga Canavese (IT)

(73) Assignee: Dayco Europe S.R.L., Chieti (IT)

( * ) Notice: Subject to any disclaimer, the term of this patent is extended or adjusted under 35 U.S.C. 154(b) by 575 days.

(21) Appl. No.: 12/450,491

(22) PCT Filed: Mar. 27, 2007

(86) PCT No.: PCT/IT2007/000228
§ 371 (c)(1),
(2), (4) Date: Jan. 11, 2010

(87) PCT Pub. No.: WO2008/117319
PCT Pub. Date: Oct. 2, 2008

(65) Prior Publication Data
US 2010/0145591 A1    Jun. 10, 2010

(51) Int. Cl.
*G06F 17/00* (2006.01)
*F16H 7/08* (2006.01)

(52) U.S. Cl. ...................................... 701/102

(58) Field of Classification Search .................. 701/102; 474/100, 111, 112
See application file for complete search history.

(56) References Cited

U.S. PATENT DOCUMENTS

| | | | |
|---|---|---|---|
| 2,895,466 A * | 7/1959 | Mall et al. | 123/185.2 |
| 3,934,947 A | 1/1976 | Walter et al. | |
| 4,689,037 A | 8/1987 | Bytzek | |
| 4,721,495 A | 1/1988 | Kan et al. | |
| 5,558,587 A | 9/1996 | Church | |
| 5,620,385 A | 4/1997 | Cascionale et al. | |
| 5,759,125 A | 6/1998 | Berg | |
| 5,993,340 A | 11/1999 | Rocca et al. | |
| 6,761,483 B1 | 7/2004 | Michiels | |
| 6,857,979 B2 | 2/2005 | Macnaughton et al. | |
| 7,165,521 B2 | 1/2007 | Nakajima | |
| 7,273,432 B2 | 9/2007 | Schonmeier et al. | |
| 7,611,431 B2 | 11/2009 | Dinca et al. | |
| 7,637,829 B2 | 12/2009 | Stone et al. | |
| 7,874,950 B2 | 1/2011 | Lehtovaara et al. | |
| 7,980,976 B2 | 7/2011 | Stepniak et al. | |
| 7,985,151 B2 | 7/2011 | Singer | |
| 2003/0083164 A1 | 5/2003 | MacNaughton et al. | |

(Continued)

FOREIGN PATENT DOCUMENTS

DE    4313058    10/1993

(Continued)

OTHER PUBLICATIONS

International Search Report and Written Opinion mailed Oct. 23, 2007 in application PCT/IT2006/000836.

(Continued)

*Primary Examiner* — Hieu T Vo
(74) *Attorney, Agent, or Firm* — Davidson Berquist Jackson & Gowdey, LLP (57) ABSTRACT

A drive for an internal combustion engine having a predetermined take-up rate (TU) and comprising a drive pulley, a driven pulley, a shoe and an oil wet toothed belt cooperating in contact with a guiding surface of the shoe, presenting an optimized winding angle ($\alpha$) of the guiding surface to decrease the power dissipated on the toothed belt.

10 Claims, 7 Drawing Sheets

U.S. PATENT DOCUMENTS

| | | | |
|---|---|---|---|
| 2006/0068957 A1 | 3/2006 | Stone et al. |
| 2008/0025658 A1 | 1/2008 | Hochmayr et al. |
| 2008/0153642 A1 | 6/2008 | Baumuller et al. |
| 2008/0287233 A1 | 11/2008 | Cantatore |
| 2010/0190594 A1 | 7/2010 | Rolando et al. |
| 2010/0190595 A1 | 7/2010 | Baumuller et al. |
| 2011/0045929 A1 | 2/2011 | Rolando et al. |
| 2011/0218066 A1 | 9/2011 | Rolando |

FOREIGN PATENT DOCUMENTS

| | | |
|---|---|---|
| DE | 19614546 | 10/1996 |
| DE | 10021587 | 11/2001 |
| EP | 0709595 | 5/1996 |
| EP | 1746306 | 1/2007 |
| EP | 2239483 A2 * | 10/2010 |
| GB | 2233063 | 1/1991 |
| JP | 2004-150552 | 5/2004 |
| WO | WO 99/28652 | 6/1999 |
| WO | WO 2005/038297 | 4/2005 |
| WO | WO 2005/080820 | 9/2005 |
| WO | WO 2006/111988 | 10/2006 |
| WO | WO 2008/068782 | 6/2008 |
| WO | WO 2008/117319 | 10/2008 |
| WO | WO 2008/149390 | 12/2008 |

OTHER PUBLICATIONS

International Search Report mailed Nov. 9, 2007 in PCT Appln. No. PCT/IT2007/000394.

U.S. Appl. No. 12/312,978—Oct. 17, 2011 PTO Office Action.

U.S. Appl. No. 12/451,883—Dec. 22, 2011 PTO Office Action.

International Search Report and Written Opinion mailed Nov. 7, 2007 in PCT Appln. No. PCT/IT2007/000228.

* cited by examiner

DRIVE FOR AN INTERNAL COMBUSTION ENGINE COMPRISING AN OIL WET TOOTHED BELT AND A TENSIONING SHOE

TECHNICAL FIELD

The present invention relates to a drive for an internal combustion engine comprising an oil wet toothed belt and one or more tensioning shoes.

BACKGROUND ART

There have recently been developed engines for motor vehicles comprising a timing belt having an oil wet belt and capable of meeting at least the same durability requirements as dry belt drives or chain drives. It is specified that the expression "oil wet" used in the description and in the claims refers both to applications in which the belt is at least partially immersed in oil at rest and to applications in which the oil is conveyed on the belt, e.g. by spraying by means of a specific nozzle or by splashing due to the action of the belt or the pulleys.

Specifically, the environment in which the belt drive of the present invention works may be the same as that in which a chain drive works.

With respect to chain drives, belt drives present lower costs and much lower loss due to friction. Furthermore, a belt drive is less noisy and the elongation of the belt is lower by at least one fourth with respect to that of a chain: this allows to more precisely control the internal combustion engine valves.

A chain drive generally comprises a tensioning device for guaranteeing the correct operation of the belt.

As the belt is oil wet, it may be tensioned by means of a shoe operated by an actuator. The shoes have the advantage of being mountable in small spaces and thus of making the drive compact. In this manner, the belt drive is interchangeable with a chain drive without having to modify the compartment which accommodates the drive.

However, a shoe having a non-optimised longitudinal profile causes an increase of power dissipated by friction against the belt and the subsequent temperature increase deteriorates the belt and reduces the active working life thereof.

DISCLOSURE OF INVENTION

It is the object of the present invention to make an engine oil wet belt drive, comprising a shoe having an optimised geometry for reducing the power dissipated by friction of the belt on the shoe, without impairing the durability requirements required in automotive applications.

The aforesaid object is achieved by means of a drive according to claim 1.

BRIEF DESCRIPTION OF THE DRAWINGS

For a better understanding of the present invention, a preferred embodiment thereof will be described hereinafter only by way of non-limitative example and with reference to the accompanying drawings, in which.

BEST MODE FOR CARRYING OUT THE INVENTION

Figure 1:
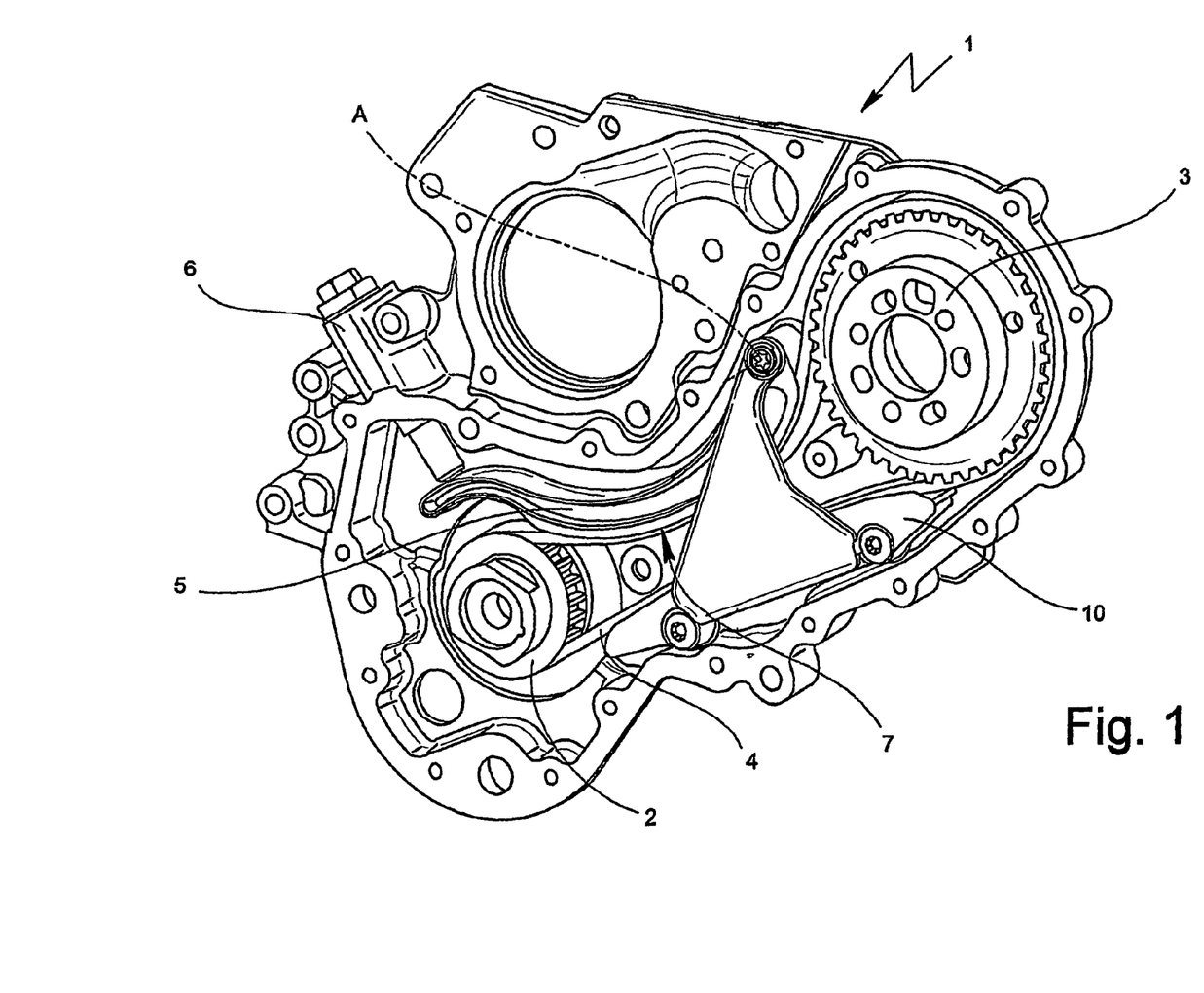
FIG. 1 is a diagrammatic view of a drive comprising a shoe according to the present invention.

With reference to FIG. 1, numeral 1 indicates as a whole a synchronous drive of an internal combustion engine comprising a drive pulley 2 rigidly connected to a crankshaft of an internal combustion engine and a driven pulley 3 directly connected to an injection pump of the internal combustion engine. Furthermore, pulley 3 is connected to the camshaft by means of a second drive (not shown).

Pulleys 2 and 3 are reciprocally connected by an oil wet toothed belt 4 for transmitting power between the crankshaft and the pump. For example, toothed belt 4 is made as described in patent application WO-A1-2005080820 by the same applicant.

Specifically, toothed belt 4 comprises an elastomeric material body appropriately selected to withstand the aggression of the lubricant oil, a toothed portion coupled to pulleys 2 and 3, a plurality of filiform elements incorporated in the body, a back arranged on the opposite side of the toothed portion with respect to the filiform elements and a resistant fabric arranged on the back.

The operating tension of toothed belt 4 is controlled by means of a shoe 5 cooperating with a slack branch of belt drive 1 and rotatable about a fixed axis A with respect to a wall of the internal combustion engine.

Preferably, belt drive 1 further comprises a gliding shoe 10 for guiding the taut branch of drive 1 and reducing the flexural vibrations of the latter.

Shoe 5 is kept in contact against a friction-wear-resistant fabric of toothed belt 4 by means of actuating means 6, which may comprise either an elastic element and a damping element or a fluid linear actuator.

Specifically, shoe 5 defines a guide for toothed belt 4 by means of a contact surface 7 on which the back of toothed belt 4 slides in use.

According to a preferred embodiment, shoe 5 is preferably formed by a wear-resistant metallic material by sintering. In this manner, shoe 5 presents a porosity so as to favour the permanence of the oil along contact surface 7.

The theoretical power dissipated by friction against the back of toothed belt 4 may be expressed by first approximation by means of the formula:

$$W_t = T_t \left( \frac{2\pi RPM}{60} \cdot R_m \right) \cdot (1 - e^{-f\alpha})$$

where f=characteristic friction coefficient of the lubricated contact between back of toothed belt 4 and shoe 5 and normally considered in the range from 0.04 to 0.15 and independent from the curved abscissa;

RPM=revolution speed of drive pulley 2;

Rm=pitch radius of drive pulley 2;

Tt=branch tension of the belt comprised between contact surface 7 and drive pulley 3; and α=winding angle along which the back of toothed belt 4 comes into contact with contact surface 7.

Specifically, winding angle α may be calculated for any longitudinal profile of contact surface 7 as will be specified in better detail below.

The formula above establishes a direct relation between the dissipated power and winding angle α of shoe 5 and is used for dimensioning the profile of the latter by means of an optimisation method.

Furthermore, the step of defining the geometry of the drive comprises the definition of a target value of the length of the belt which corresponds to the length of toothed belt 4 along the reinforcement elements in the balanced condition with respect to which take-up rate TU is calculated.

The optimisation method according to the present invention comprises the step of establishing a drive take-up rate TU. The take-up rate is defined as the millimeters of variation of the belt drive layout for each degree of revolution of shoe 5.

Specifically, the belt drive layout is the length of a geometric line measured at the neutral axis of a belt which is wound about pulleys 2, 3 and comes into contact with shoe 5 for each position of the latter. Therefore, it is possible to calculate a belt drive layout corresponding to each position of shoe 5.

The optimisation method further comprises the step of defining the geometry of drive 1, i.e. the pitch diameters of pulleys 2, 3 and the geometric coordinates of the rotation axes of drive pulley 2 and of driven pulley 3. Such data are summarised in a "wheel diagram" and allow to geometrically calculate the belt drive layout.

Furthermore, the position of axis A may be an input datum, e.g. in the case in which the belt drive is an upgrade or retrofit of an existing chain drive. In the case in which the position of axis A is a project datum, an initial position must be assumed.

The data collected during the step of defining the geometry of drive 1 are used to construct a two-dimensional geometric model of the drive in which contact surface 7 of shoe 5 is defined by a profile having a single arc of circumference having a diameter D' (see FIG. 2) by a computerised design software. Specifically, the elements of the model shown in FIG. 2 either identical or equivalent to those of drive 1 present the same reference numbers followed by an apex "'".

Figure 2:
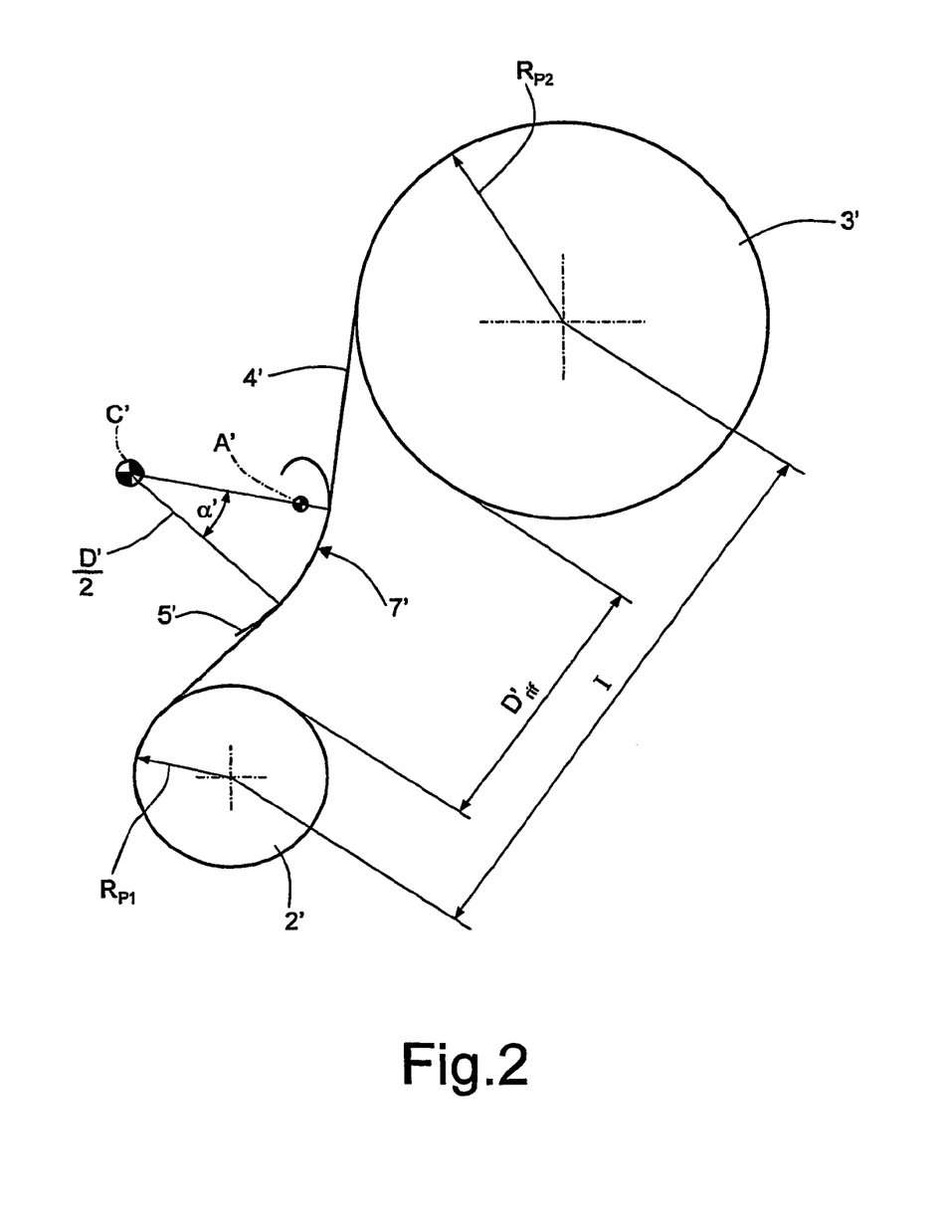
FIG. 2 is a diagram of a representative geometric model of the drive in FIG. 1.

The optimisation method further comprises, by means of the use of the geometric model in FIG. 2, the step of tracing a graph which shows the variation of winding angle α' as a function of the variation of diameter D' of contact surface 7' so that take-up rate TU' is constant and equal to the target take-up rate TU.

Specifically, it must be specified that in a drive, the winding angle may be univocally calculated if the take-up rate, the position of axis A, the length of the belt and the geometry of the shoe are set. For example, the value of the winding angle may be determined as follows:

a) setting an initial position of centre C';

b) turning the shoe so as to verify that the belt drive layout is equal to the target value of the length of toothed belt 4;

c) calculating the value of take-up rate TU' by rotating the profile about A' with arm A'C';

d) correcting the position of centre C' according to points a), b) and iteratively checking take-up rate TU' again according to point c) so as to obtain the value of arm A'C' so that take-up rate TU' is equal to the target take-up rate TU; and, if TU'=TU e) maintaining arm A'C' fixed and calculating winding angle α in the condition in which the belt drive layout is equal to the target value of the length of toothed belt 4.

For example, take-up rate TU' is calculated as mean value on the basis of the difference of belt drive layouts related to two 2° rotations, respectively clockwise and anticlockwise, of contact surface 7' about axis A' starting from the position in which the belt drive layout is equal to the target length of toothed belt 4'.

Figure 3:
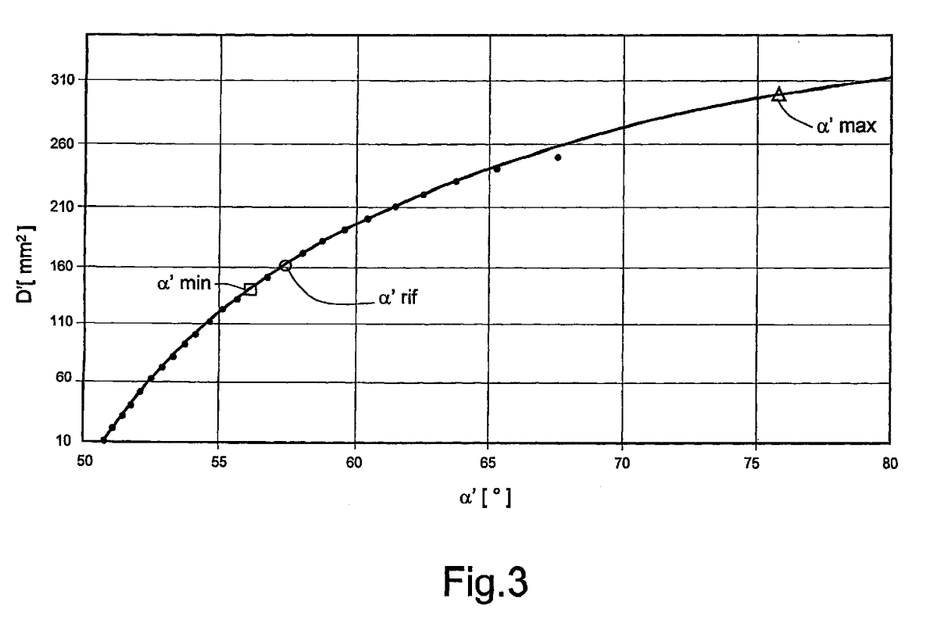
FIG. 3 is a qualitative graph of the trend of an optimisation function for dimensioning the shoe in FIG. 1.

Preferably, each point of the curve in FIG. 3 is obtained according to the above-described procedure.

Even more preferably, the first point of the graph in FIG. 3 is obtained on the basis of a reference diameter D'rif equal to the difference between the centre distance I of pulleys 2', 3' and the sum of pitch diameters Rp1, Rp2 of corresponding pulleys 2', 3'. Corresponding angle α'rif is calculated so that TU' is equal to target take-up rate TU, as previously described.

Subsequently, a 10 mm variation pitch of the diameter is fixed and for each value of new diameter D' obtained either by subtraction or subsequent addition on the basis of D'rif, corresponding α' is calculated using the above-described procedure.

On the graph thus obtained, it is possible to locally calculate an incremental relationship defined as:

$$K = \frac{\alpha'_{i+1} - \alpha'_i}{D'_{i+1} - D'_i}$$

where $D'_{i+1} - D'_i = 10$ mm.

It has been verified that incremental relationship value K is important to evaluate the optimal value of winding angle α of shoe 5 so as to obtain a reduced dissipated power.

However, the graph in FIG. 3 is characteristic of the specific geometry reproduced in the geometric model by means of which the diagram itself is obtained. In order to adapt the range to the drive geometry, it was understood that a parameter suited to the purpose was defined by the formula:

$$1\% \leq G = \frac{\alpha'_{i+1} - \alpha'_i}{\alpha'_{rif}} \leq 4\%$$

where:

$\alpha'_{i+1} - \alpha'_i$ is the numerator of incremental relationship K so that $D'_{i+1} - D'_i = 10$ mm; and α'rif allows to refer parameter G to the drive dimension because it essentially depends on the centre difference between the two pulleys which identify the drive branch with which the shoe cooperates.

According to an important aspect of the present invention, lower limit α'min is the smallest angle between $\alpha'_n$ and $\alpha'_{n-1}$ in relation to which G=1% for a diameter variation D' equal to 10 mm and upper limit α'max is equal to the largest angle between $\alpha'_{m+1}$ and $\alpha'_m$ in relation to which G=4% for a variation of diameter D' equal to 10 mm, i.e. it must be verified that:

$$\frac{\alpha'_{max} - \alpha'_m}{\alpha'_{rif}} = 4\%$$

$$\frac{\alpha'_n - \alpha'_{min}}{\alpha'_{rif}} = 1\%$$

With reference to FIG. 3 and to dissipated power expression W, for values lower than α'min, dissipated power reduction W reduced with respect to a non-negligible decrease, i.e. of 10 mm, of the diameter of contact surface 7'.

Specifically, it was evaluated that the power dissipated by a drive according to the present invention may be Wrif=1200 W for α'rif. With reference to parameter G and by means of the linearization of dissipated power expression W, winding angle α is comprised between a minimum value below which the dissipated power decrease is 12 W for a 10 mm variation of D' and above which the dissipated power increase is 48 W for a 10 mm variation of D'.

An increase of 48 W for a 10 mm variation of diameter D' is deemed considerable and thus, for values higher than α'max, it is possible that small dimensional increases may be considerably amplified and compromise the durability of the transmission.

A 12 W increase for a non-negligible 10 mm variation of diameter D' is deemed negligible. The benefit obtained in terms of dissipated power reduction is not such to compensate for undesired effects due to excessively small diameters D'.

Specifically, an excessive decrease of the diameter causes problems such as an increase of the specific dissipated power as the surface of shoe 5 is reduced and such as the increase of theoretical local pressure between the back of toothed belt 4 and contact surface 7, as such pressure is expressed by means of the formula:

$$p = \frac{T(\alpha)}{R \cdot s}$$

where:

T depends on winding angle α and is the resultant of the tension of the slack branch of drive 1 which comes into contact with shoe 5;

R is the curvature radius in the point of contact surface 7 in which the pressure is calculated; and s is the length of the portion of toothed belt 4 in contact with shoe 5.

Therefore, the theoretical pressure is inversely proportional to the curvature radius of contact surface 7 and increases when D' decreases.

In some configurations of drive 1, the α'max value may not be calculated by means of the geometric model with a contact surface 7' defined by a single arc of circumference. In such configurations, the G=4% limit indeed requires large D' diameters which interfere with pulleys 2', 3' before verifying the requirement of maintaining the take-up rate constant.

In this case, it is possible to calculate α'max by means of the interpolation with a hyperbole or an exponential curve (shown by a solid line in FIG. 3) of the points obtained on the basis of diameters D' which do not interfere with pulleys 2, 3. Specifically, it is preferable that the interpolation determination coefficient is from 0.98 to 1.

In the latter case, α'max is calculated independently from the geometric interference of contact surface 7' with pulleys 2', 3'.

Even more preferably, the α'max value may be determined by setting G=2.5%. In this range, the dissipated power is reduced.

Furthermore, it is possible to use a shoe 5 having a contact surface 7 consisting of an arc of circumference and to avoid an interference with pulleys 2', 3'.

Once determined the α'min and α'max values, it is possible to make shoe 5 in which contact surface 7 presents a winding angle α between α'min and α'max when drive 1 is static and ready for use.

In general, it is preferable to employ a shoe 5 having a contact surface 7 defined by means of a single arc of circumference.

In this case, indeed, the curvature radius is constant and it was verified that the temperature on contact surface 7 does not present high local concentrations. More in general, it is preferable to select a contact surface 7 having a profile with a continuous second derivate so that temperature concentrations which are detrimental to toothed belt 4 do not occur.

However, cases may occur in which it is necessary to draw away from a profile having a single arc of circumference due to geometric or layout constraints.

For example, the drive which is designed to be an upgrade or retrofit of a chain drive in which the dimensions of many components have already been determined, such as for example the dimension of the bushing which defines axis A or the dimension of the hydraulic actuator and of the application point in which the rod of the hydraulic actuator comes into contact with shoe 5.

In these cases, it is possible to make contact surface 7 as a sequence of a plurality of arcs of circumference which have a common tangent in the union point and whose corresponding subtended angles $\alpha_j$, after being summed, must be smaller than α'max, i.e.:

$$\alpha'_{min} \leq \Sigma \alpha_j \leq \alpha'_{max}.$$

In many practical cases, a profile defined by a plurality of arcs of circumference is sought to reduce the dimensions of shoe 5 so that the subtended chord of contact surface 7 is reduced with respect to a contact surface defined by a single arc of circumference.

In other cases, the distance between axis A and the application of point of the hydraulic actuator is particularly long. In this case, the winding arc determined by the specific layout may be in that area, if present, of the graph in FIG. 3 obtained by interpolation.

In general, it is possible that contact surface 7 is defined by any profile having a continuous first derivative, preferably having at least one continuous second derivative, and a concavity facing the opposite side with respect to the back of toothed belt 4 and whose winding arc a may be calculated as:

$$\alpha = \int_S \frac{2ds}{D(s)}$$

where S is the curved abscissa of the profile along which the back of toothed belt 4 comes into contact with contact surface 7 when drive 1 is in the balanced condition described for calculating take-up rate TU.

Such a generalisation is possible as the dissipated power, at least by first approximation, depends only on the global value of the winding angle and not directly on the curvature of contact surface 7.

The invention will now be described with reference to some embodiments.

A chain drive already present on the market was initially selected. The reference drive presents coordinates of the drive pulley, the gliding shoe and the driven pulley shown in the "wheel diagram" in table 1. Furthermore, the reference chain drive presents a shoe having a winding angle α=78.87° and hinged about axis A having coordinates x=103.66 mm and y=145.66 mm.

According to a first embodiment, the reference drive was adapted to a belt drive by means of a shoe obtained according to the method of the present invention (FIG. 1) and without modifying any other geometric data, including the position of axis A.

TABLE 1

LAYOUT

| Description | N. of teeth | Pitch diameters [mm] | Transmission ratio | Coordinates [mm] X | Coordinates [mm] Y | Winding angle [Deg] | Winding angle [mm] | Meshing teeth |
|---|---|---|---|---|---|---|---|---|
| Drive | 20 | 60.64 | 1.00 | 0.00 | 0.00 | 199.22 | 105.42 | 11.00 |
| Gliding | — | −1202.90 | | 483.00 | −414.51 | 8.77 | −92.01 | — |
| shoe | — | −402.90 | | 261.53 | −81.47 | 5.22 | −18.35 | — |
| Driven | 40 | 121.28 | 0.50 | 179.28 | 172.01 | 236.15 | 249.93 | 26.00 |
| Shoe | — | −252.90 | | −10.17 | 156.18 | 10.65 | −23.50 | — |
| | — | −202.90 | | 13.84 | 149.25 | 50.73 | −89.83 | — |

FIG. 3 relates to a curve obtained by points by means of the use of the above-described method and applied to the drive having the geometry specified in table 1.

Specifically, FIG. 3 is obtained with a belt of length equal to 809.76 mm. Furthermore, the negative sign of the diameters in table 1 is a convention to indicate that the corresponding arcs of circumference cooperate with the back of toothing belt 4.

In relation to shoe 5, the values of $\alpha'$max and $\alpha'$min calculated for a TU=1.117 mm/° are 56.16° and 75.90°. Preferably, the $\alpha'$max and $\alpha'$min values are 56.16° and 65.27°.

Figure 7:
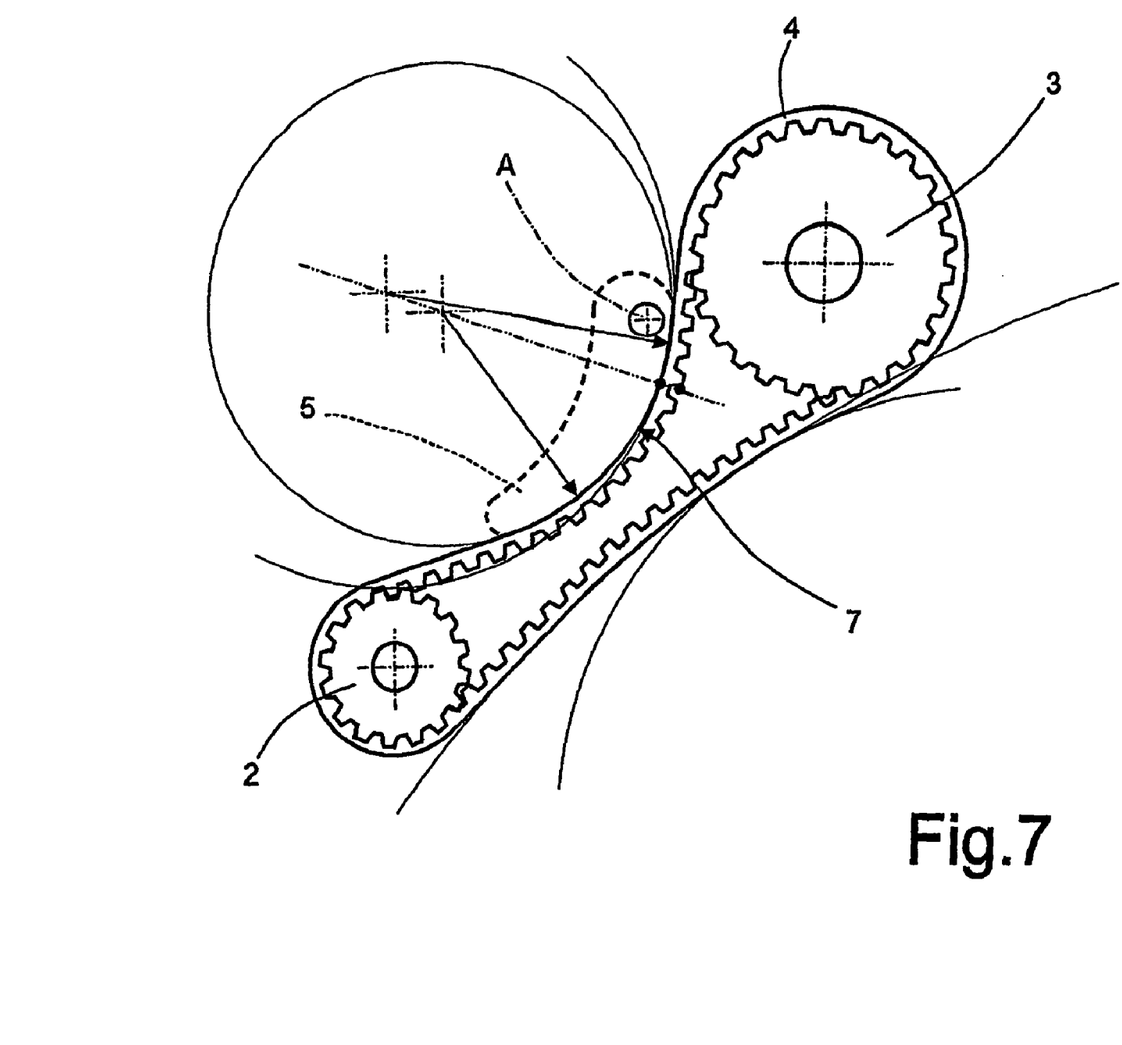
FIG. 7 is a diagrammatic view of a shoe according to the present invention.

For example, contact surface 7 defined by a third and forth negative diameter in table 1 present a winding angle defined by a first arc of circumference of 10.65° and by a second arc of circumference of 50.73° (FIG. 7 and table 1).

The belt drive with optimised shoe and with a 19 mm wide belt successfully passed a 616 h durability test aboard an engine running at 100% of load and having the power of the engine on which the chain reference drive worked. The durability test conditions are shown in tables 2 and 3.

An identical belt drive having a shoe with a winding angle $\alpha$=78.87, i.e. with a winding angle of the reference chain drive, was damaged beyond repair after 250 h, all other conditions being equal.

After the durability test, the belt drive of the invention was tested on a test bench having an electrical motor connected to drive pulley 2 and presenting two torque meters connected to pulleys 2, 3 and more in general to all the pulleys of drive 1.

TABLE 2

| Total time (hours - h) | |
|---|---|
| 616.25 | |
| Subcycle time (hours - h) | |
| 0.3625 | |
| Subcycle repetitions | |
| 1700 | |
| Oil temperature (n. of subcycles) | |
| 135° | 850 |
| 140° | 765 |
| 145° | 85 |
| Test diagram | |
| This cycle must be repeated 85 times: | |
| Subcycle repetitions | Oil sump temperature (° C.) |
| 1 | 10 | 135 |
| 2 | 9 | 140 |
| 3 | 1 | 145 |
| Oil change every 50 hours | |

TABLE 3

Subcycle

| Step | Time (s) | Time at end of step (s) | Step time (s) | rpm | Load (%) |
|---|---|---|---|---|---|
| 0 | 0 | 0 | 0 | 800 | 0 |
| 1 | 0 | 5 | 5 | 1700 | 100 |
| 2 | 5 | 55 | 50 | 2100 | 100 |
| 3 | 55 | 105 | 50 | 1700 | 100 |
| 4 | 105 | 110 | 5 | 2100 | 100 |
| 5 | 110 | 160 | 50 | 2300 | 100 |
| 6 | 160 | 210 | 50 | 2100 | 100 |
| 7 | 210 | 215 | 5 | 2300 | 100 |
| 8 | 215 | 240 | 25 | 2500 | 100 |
| 9 | 240 | 265 | 25 | 2300 | 100 |
| 10 | 265 | 290 | 25 | 2500 | 100 |
| 11 | 290 | 315 | 25 | 2300 | 100 |
| 12 | 315 | 320 | 5 | 2100 | 100 |
| 13 | 320 | 370 | 50 | 2300 | 100 |
| 14 | 370 | 420 | 50 | 2100 | 100 |
| 15 | 420 | 425 | 5 | 1700 | 100 |
| 16 | 425 | 475 | 50 | 2100 | 100 |
| 17 | 475 | 525 | 50 | 1700 | 100 |
| 18 | 525 | 530 | 5 | 2900 | 100 |
| 19 | 530 | 580 | 50 | 3300 | 100 |
| 20 | 580 | 630 | 50 | 2900 | 100 |
| 21 | 630 | 635 | 5 | 3300 | 100 |
| 22 | 635 | 695 | 60 | 3700 | 100 |
| 23 | 695 | 755 | 60 | 3300 | 100 |
| 24 | 755 | 760 | 5 | 3700 | 100 |
| 25 | 760 | 810 | 50 | 4100 | 100 |
| 26 | 810 | 860 | 50 | 3700 | 100 |
| 27 | 860 | 865 | 5 | 4100 | 100 |
| 28 | 865 | 890 | 25 | 4300 | 100 |
| 29 | 890 | 915 | 25 | 4100 | 100 |
| 30 | 915 | 940 | 25 | 4300 | 100 |
| 31 | 940 | 965 | 25 | 4100 | 100 |
| 32 | 965 | 970 | 5 | 3700 | 100 |
| 33 | 970 | 1020 | 50 | 4100 | 100 |
| 34 | 1020 | 1070 | 50 | 3700 | 100 |
| 35 | 1070 | 1075 | 5 | 3300 | 100 |
| 36 | 1075 | 1135 | 60 | 3700 | 100 |
| 37 | 1135 | 1195 | 60 | 3300 | 100 |
| 38 | 1195 | 1200 | 5 | 2900 | 100 |
| 39 | 1200 | 1250 | 50 | 3300 | 100 |
| 40 | 1250 | 1300 | 50 | 2900 | 100 |
| 41 | 1300 | 1305 | 5 | 1700 | 100 |

The belt drive test conditions were:
no load applied to drive pulley 3;
constant revolution speed;
load exerted by the hydraulic actuator on the slack branch equal to 300N;
spray lubrication conditions and oil temperature of 40° and variable flow rate as a function of the revolution speed from 30 to 180 liters/h.

The dissipated power is obtained on the basis of the difference between the power calculated on the basis of the torque on drive pulley 2 and the power calculated on the basis of the torque on drive pulley 3.

The electrical motor drives the drive and the torque measured on the driven pulley allows to check for possible faults, such as for example if one of the bearings is damaged and thus dissipates anomalous power.

The same test was performed for the reference chain drive with the shoe having a winding angle of α=78.87.

The test conditions on the chain drive were identical to those described above except for the load value on the slack branch which in this case was equal to 200N.

From bench tests performed on drives at a speed of 4500 rpm with a oil flow rate equal to 180 liters/h it resulted that the power dissipated by the belt drive with the optimised shoe was 780 W and that dissipated by the reference chain drive was 1300 W despite a lower load was applied to the latter. Therefore, the belt drive with the shoe of the invention allows to considerably reduce the dissipated power and, consequently, to reduce the polluting emissions of an engine with respect to a chain drive.

Figure 4:
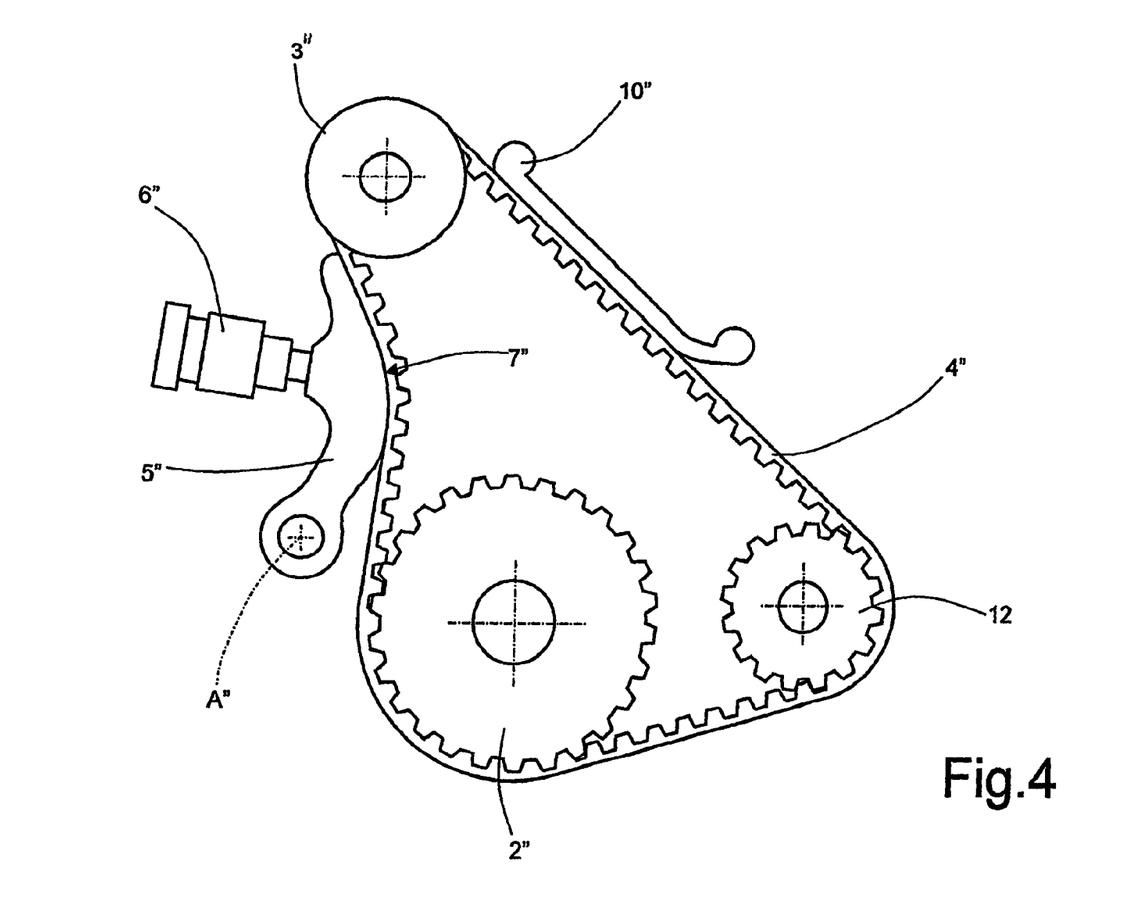
FIGS. 4 and 5 depict corresponding further embodiments of the present invention.

In a second embodiment, shown in FIG. 4, the geometry of the drive is defined by the "wheel diagram" in table 4. Specifically, the elements in FIG. 4 functionally identical or similar to those of drive 1 are followed by "''". The drive in FIG. 4 connects drive pulley 2" to a pair of driven pulleys 3", 12 to control corresponding balancing countershafts. Specifically, the balancing countershaft connected to pulley 3" with 24 teeth is further connected to a gear so that the total transmission ratio is equal to 2.

TABLE 4

| Description | N. of teeth | Pitch diameters [mm] | Transmission ratio | Coordinates [mm] X | Coordinates [mm] Y | Winding angle [Deg] | Winding angle [mm] | Meshing teeth |
|---|---|---|---|---|---|---|---|---|
| Drive | 42 | 100.27 | 1.00 | 0.00 | 0.00 | 123.74 | 108.27 | 14.00 |
| Countershaf | 24 | 57.30 | 1.75 | 84.14 | 35.12 | 130.03 | 65.02 | 8.00 |
| Gliding | — | −277.44 | | 55.07 | 214.46 | 30.09 | −72.84 | — |
| Countershaf | 21 | 50.13 | 2.00 | −81.00 | 118.00 | 184.16 | 80.56 | 10.00 |
| Tensioner | — | −73.04 | | −88.72 | 44.45 | 47.84 | −30.49 | — |

Furthermore, the length of toothed belt 4 is equal to 637.3 mm and the coordinates of axis A are x=−69.0 mm, y=−1.5 mm. Furthermore, the first diameter with negative value defines the geometry of gliding shoe 10.

The values of α'max and α'min calculated for a TU=0.706 mm/° are 45.02° and 55.37° (G=1%, G=4%). Preferably, calculated α'max and α'min are 45.02° and 53.04° (G=1%, G=2.5%).

Figure 5:
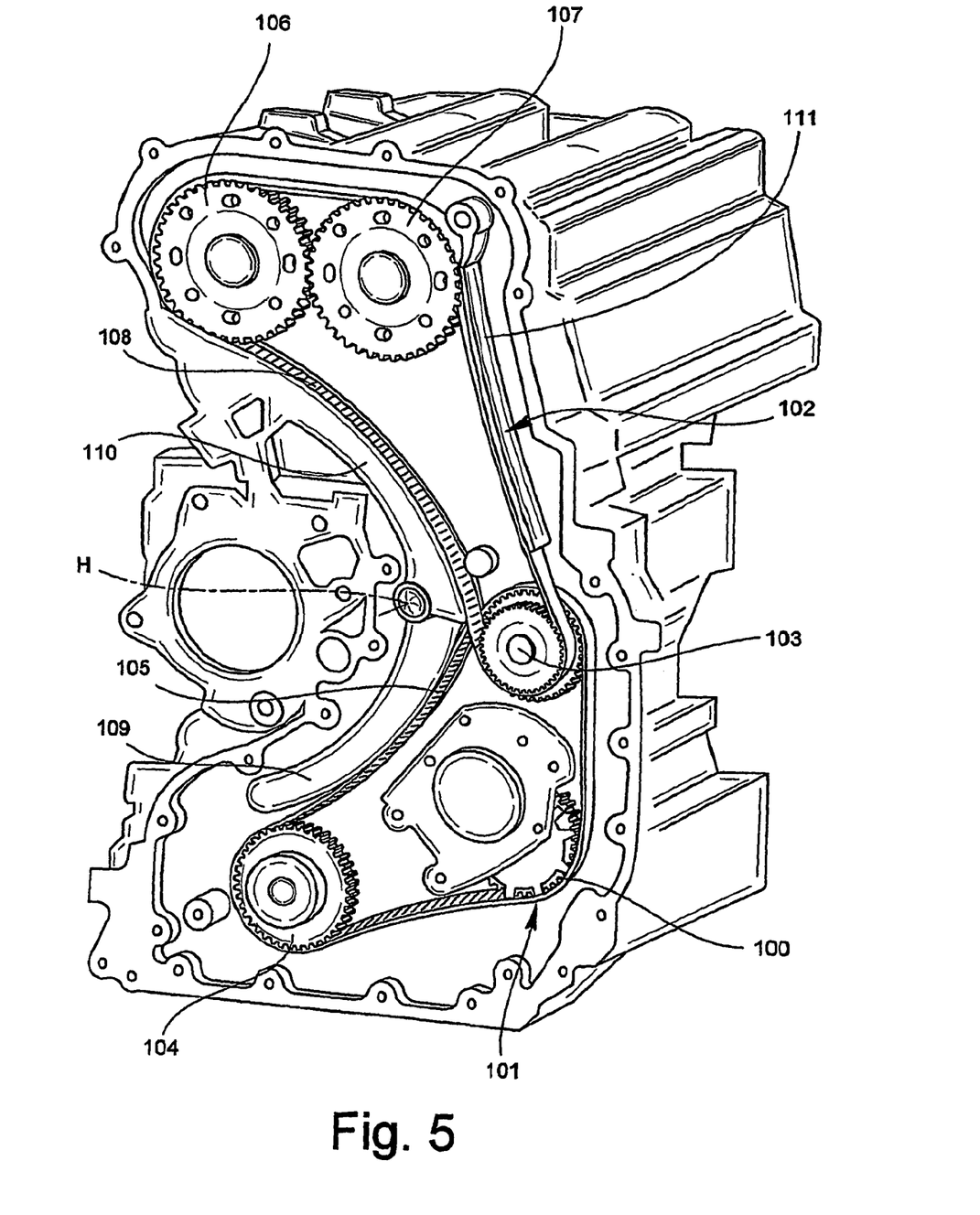
Figure 6:
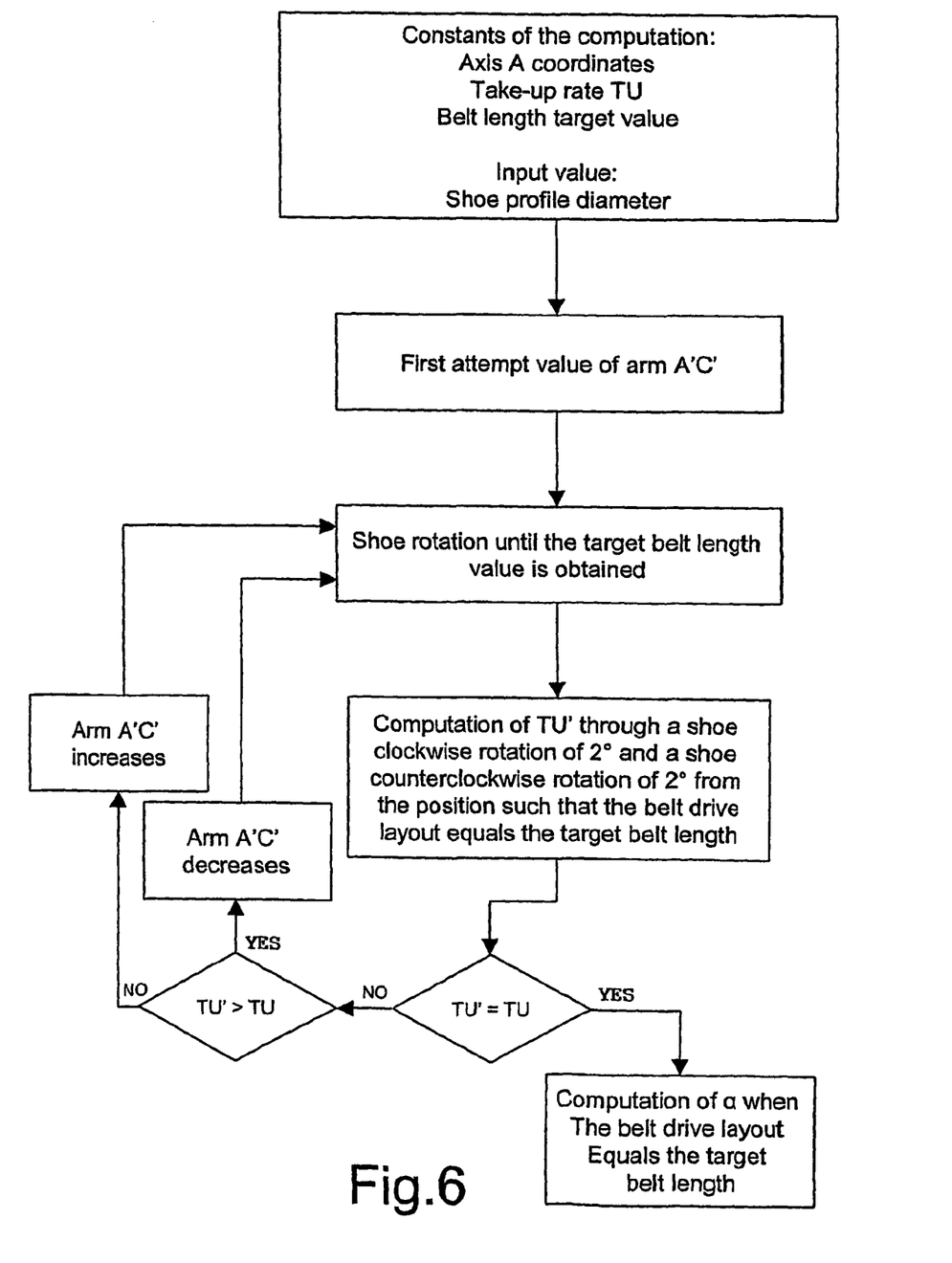
FIG. 6 is a flow chart related to a step of the method which allows to make a shoe according to the present invention.

A further embodiment of the present invention is schematically shown in FIG. 5 in which a first and a second belt drive 101, 102 are connected together by means of a double pulley 103.

Specifically, belt drive 101 comprises a drive pulley 104 connected to the internal combustion engine crankshaft, a driven pulley 100 connected to an oil and power steering pump and a vacuum unit, double pulley 103 connected to an injection pump and to drive 102, and a toothed belt 105.

Belt drive 102 comprises a double pulley 103, a first and a second pulley 106, 107 for driving corresponding camshafts and a toothed belt 108.

Furthermore, belt drive 101 is pulled by means of a first shoe 109 hinged about axis H.

Belt drive 102 comprises a first shoe 110 hinged about axis H and cooperating with a slack branch of drive 102, and a second shoe 111 cooperating with a slack branch of drive 102.

It is finally apparent that modifications and variations may be made to the belt drives described and shown herein without for this departing from the scope of protection of the present invention as defined in the accompanying claims.

For example, shoe 5 may define a profile having a concave portion and a convex portion.

In this case, winding angle α is defined by the only portion in contact with the back of toothed belt 4.

Furthermore, shoe 5 may be made by moulding of polymeric material, e.g. a natural polyamide without fillers.

The invention claimed is:

1. A drive for an internal combustion engine having a predetermined take-up rate (TU) and comprising a drive pulley having a first pitch radius (Rp1), a driven pulley having a second pitch radius (Rp2), a shoe hinged about an axis (A) and a toothed belt which is oil wet and cooperating in contact with a guiding surface of said shoe, being a winding angle (α) of said guiding surface comprised between a maximum value (α'max) and a minimum value (α'min) so that:

$$\frac{\alpha'_{max} - \alpha'_m}{\alpha'_{rif}} = 4\%$$

$$\frac{\alpha'_n - \alpha'_{min}}{\alpha'_{rif}} = 1\%$$

where:
$\alpha'_m$ is the winding angle of a shoe having a guiding surface consisting of a circumference arc having diameter $D'_m$ so that $D'_{\alpha'max} - D'_m = 10mm$, the take-up rate TU being unchanged;
$\alpha'_n$ is the winding angle of a shoe having a guiding surface consisting of a circumference arc of diameter $D'_n$ so that $D'_n - D'_{\alpha'min} = 10mm$, the take-up rate TU being unchanged;
$\alpha'rif$ is the winding angle of a shoe having a guiding surface consisting of an arc of circumference having diameter D'rif equal to the difference between a centre distance (I) of said drive pulley and said driven pulley and the sum of said first and second pitch radius (Rp1, Rp2).

2. The drive according to claim 1, wherein said maximum and minimum values (α'max, α'min) are such that:

$$\frac{\alpha'_{max} - \alpha'_m}{\alpha'_{rif}} = 2.5\%.$$

3. The drive according to claim 1, wherein the power (W) dissipated by friction of said drive is lower than 1200W when the drive is driven without loads at a constant revolution speed equal to 4500rpm, with a 200N load exerted on said shoe to tension said toothed belt and with oil temperature equal to 40°.

4. The drive according to claim 3, wherein said power (W) is lower than 850 W when the drive is driven without loads at a constant revolution speed equal to 4500 rpm and with a 200N load exerted on said shoe.

5. The drive according to claim 1, wherein said contact surface presents a profile consisting of an arc of circumference.

6. The drive according to claim 1, wherein said contact surface presents a profile consisting of a plurality of arcs of circumference.

7. The transmission according to claim 1, wherein said guiding surface presents a profile in which at least the second derivative is continuous.

8. The drive according to claim 1, wherein said shoe is made by sintering.

9. An optimisation method for a shoe of a synchronous drive for an internal combustion engine, said drive having a predetermined take-up rate (TU) and comprising a drive pulley having a first pitch radius (Rp1), a driven pulley having a second pitch radius (Rp2), a shoe hinged about an axis (A) and a toothed belt which is oil wet and cooperates in contact with a guiding surface of said shoe, said method comprising the step of:

determining a winding angle ($\alpha$) of said guiding surface comprised between a maximum value ($\alpha'$max) and a minimum value ($\alpha'$min) so that:

$$\frac{\alpha'_{max} - \alpha'_m}{\alpha'_{rif}} = 4\%$$

$$\frac{\alpha'_n - \alpha'_{min}}{\alpha'_{rif}} = 1\%$$

where:

$\alpha'_m$ is the winding angle of a shoe having a guiding surface consisting of a circumference arc of diameter $D'_m$ so that $D'_{\alpha max} - D'_m = 10$mm, the take-up rate TU being unchanged;

$\alpha'_m$ is the winding angle of a shoe having a guiding surface consisting of a circumference arc of diameter $D'_n$ so that $D'_n - D'_{\alpha' min} = 10$mm, the take-up rate TU being unchanged;

$\alpha'$rif is the winding angle of a shoe having a guiding surface consisting of an arc of circumference having diameter D'rif equal to the difference between a centre distance (I) of said drive pulley and said driven pulley and the sum of said first and second pitch radius (Rp1, Rp2).

10. An optimisation method according to claim 9, including the further step of defining a geometric model of said drive relatively to which said maximum and minimum values ($\alpha'$max, $\alpha'$min) are calculated.

* * * * *